DIRECTION OF ROTATION
OF 18 & 19 (ROTOR MEANS 11)

INVENTORS.
GLENN L. KELTY
SANFORD H. HINTON
BY
Herschel C. Omohundro
ATTORNEY

United States Patent Office 3,516,524
Patented June 23, 1970

3,516,524
FLUID COUPLING WITH LOCKUP CLUTCH
Glenn L. Kelty, Phoenix, and Sanford H. Hinton, Scottsdale, Ariz., assignors to The Garrett Corporation, Los Angeles, Calif., a corporation of California
Filed June 28, 1968, Ser. No. 741,097
Int. Cl. F16d 33/00
U.S. Cl. 192—3.3                        7 Claims

ABSTRACT OF THE DISCLOSURE

The subject coupling has an outer casing with complemental input and output rotor means supported for rotation therein, the input and output sections also being relatively rotatable. The input rotor means provides a chamber with a semitoroidal recess at one side for co-operation with a similar recess formed in the output rotor means which is enclosed in the chamber. Both rotor sections have vanes extending radially of the recesses in circumferentially spaced order. Each rotor section also has a clutch face arranged to oppose that of the other section and resilient means are provided to normally tend to separate such clutch faces. This action tends to dispose the open sides of the recesses in close proximity for operation in the fluid driving phase. Means are provided to conduct fluid under pressure to the recesses and rotation of the input section causes similar movement of the output section due to the reaction of the fluid against the vanes. Pressure balancing bleed holes in the output rotor permit this section to be resiliently held initially in the fluid driving position. As the speed of rotation increases, fluid pressure, due to centrifugal force, will separate the input and output sections against the force of the resilient means and cause a direct motion-transmitting engagement of the clutch faces.

SUMMARY

This invention relates generally to motion-transmitting apparatus and more specifically to means for coupling driving and driven elements of such apparatus. In power transfer means, the problem of connecting a prime mover to mechanism to be operated thereby often becomes acute, particularly when the speed of operation of the prime mover is high and the connection is desired to be interrupted and re-established without discontinuing or substantially decreasing the rate of operation of the prime mover. This problem has become increasingly severe with the widespread use of gas turbine engines as prime movers since the rates of operation are much greater than those of conventional piston engines. Heretofore, fluid couplings have been used, but they have been accompanied by loss of power due to inefficiency, slippage, fluid heating, etc. Direct drive couplings or clutches have also been proposed, but because of the high speed of the prime movers, such devices introduce high wear, thus causing an intolerable and unbalanced condition, shock and other objectionable results. It is an object of this invention to provide a fluid coupling for use in high-speeed operation and which will avoid the above-enumerated objections.

It is also an object of this invention to provide a high-speed fluid coupling which will initially establish a relatively flexible drive, between a prime mover and a driven member and then establish a positive mechanical drive with no slip after the driven member has reached a predetermined speed which is established by hydrocentrifugal means. The time interval to reach this lockup condition can also be controlled.

An object also is to provide a high-speed fluid coupling which is fully automatic in that it initially functions in a fluid drive phase and then, after the driven apparatus has reached a predetermined rate of operation, will effect a positive mechanical engagement without attention by the operator.

A further object is to provide a high-speed fluid coupling having complemental input and output rotor members which function, first, as fluid coupling elements with the slippage usually accompanying such devices, and second, as positively engaged mechanical clutch elements establishing a direct drive with no slippage.

A still further object is to provide a coupling mechanism having a housing in which complemental input and output rotors are journalled, the input rotor providing a chamber for receiving the output rotor, both rotors having recesses which co-operate to form a toroidal chamber traversed by vanes which react with fluid to effect a drive with some slippage until the driven elements attain a substantial speed, and clutch surfaces which, after the driven elements reach such speed, mechanically connect the rotors for operation in unison without slip to drive the driven elements at the same rate as the prime mover.

Another object is to provide the coupling mechanism mentioned in the preceding paragraph with resilient means to normally urge the rotor sections toward relative positions for operation in the fluid drive phase and to also provide certain parts of the mechanism with hydraulically balanced bleed holes which will initially permit the above operation, but after a predetermined speed is reached, will offer resistance to fluid flow whereby pressure sufficient to cause the parts to assume a positive mechanical connection will be generated and a no-slip drive will result.

Other objects and advantages of the invention will be pointed out in, or become apparent from, the following description of coupling mechanisms embodying the invention and selected for illustration in the accompanying drawings.

THE DRAWINGS

DESCRIPTION

Figure 1:
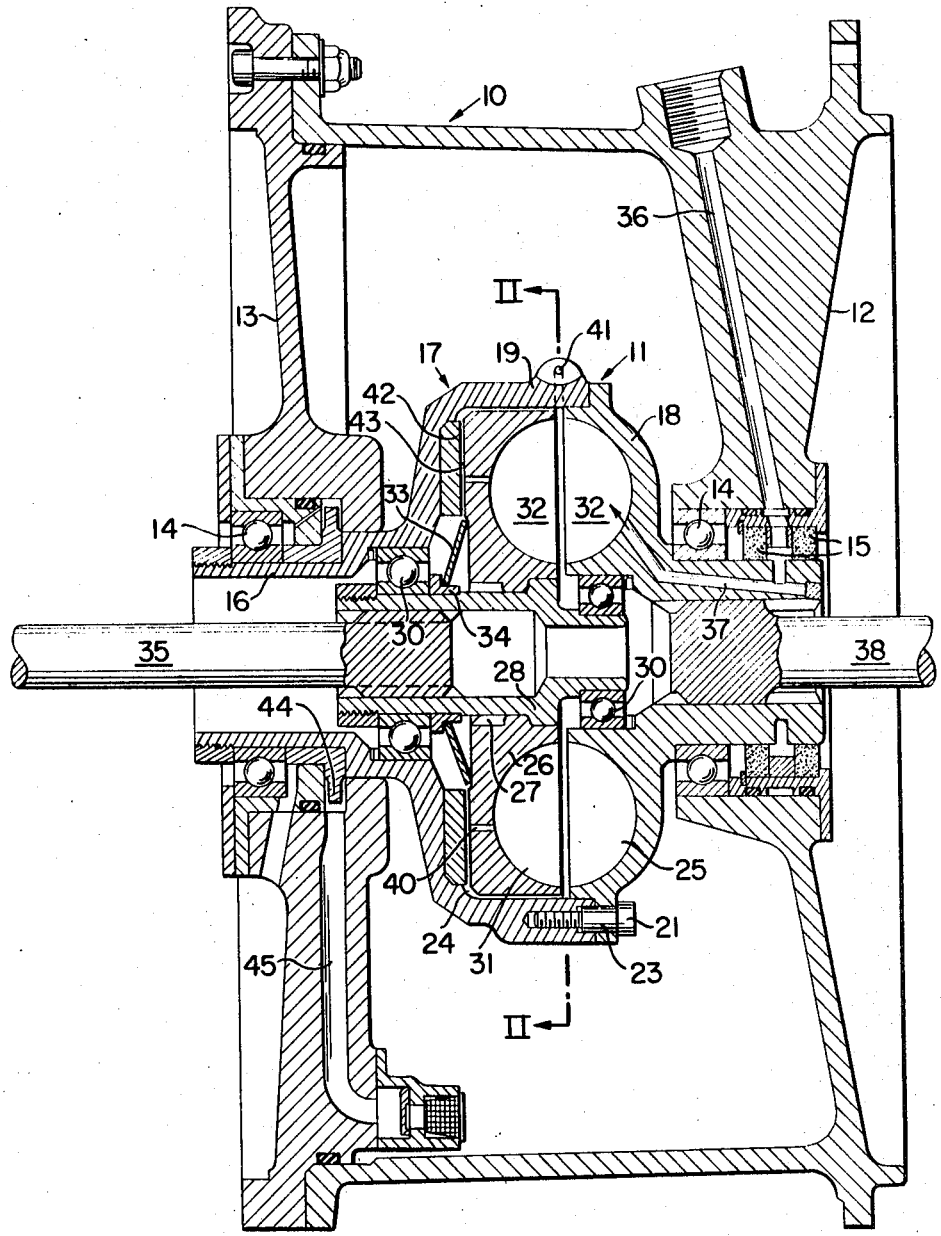
FIG. 1 is an axial sectional view taken through a fluid coupling mechanism formed in accordance with the present invention.
Figure 2:
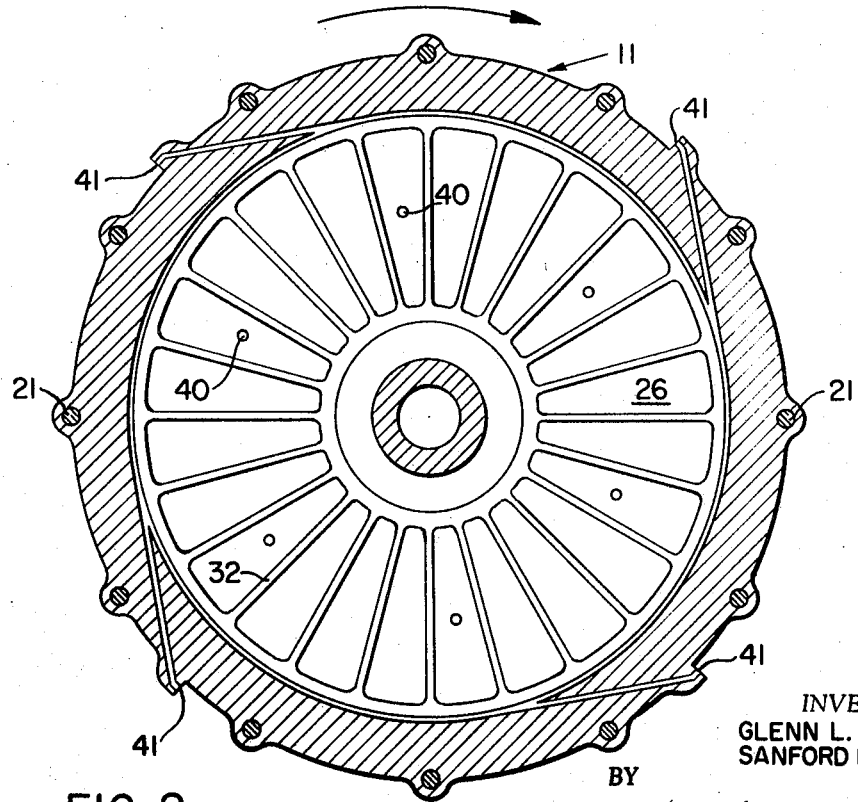
FIG. 2 is a vertical transverse sectional view taken on the plane indicated by the line II—II of FIG. 1.

In general, the high-speed fluid coupling illustrated in FIGS. 1 and 2 includes an outer housing 10 and a rotor means 11 disposed for rotation in the housing 10. To effect the rotatable support, the housing 10 has its side walls 12 and 13 formed with openings for the reception of bearings 14. Suitable sealing means 15 are also arranged in the openings to prevent the escape of hydraulic fluid used in the coupling.

The bearings 14 receive shaft sections 16 formed on the input rotor section 17 of the rotor means 11. Section 17 is made in two parts, 18 and 19, which are secured together by a series of bolts 21 threaded onto the section 19, to secure the sections to one another. The bolts are constructed in such a manner as to act as dowel pins 23 to locate the sections relative to one another and insure their unitary rotation. Sections 18 and 19 provide a chamber 24 and a semitoroidal recess 25, the latter being disposed in the section 18 and having the open side thereof facing the chamber 24. This chamber 24 receives an output rotor section 26 which is splined, as at 27, to a short shaft section 28 journalled for rotation in bearings 30 supported in the input rotor section 18, 19. Output rotor 26 is also formed with a semitoroidal recess 31 having an open side facing the open side of the similar recess 25 in section 18.

As shown in FIG. 2, semitoroidal recesses 25 and 31 are provided with vanes 32 extending radially in the recesses 25 and 31, the vanes being circumferentially spaced in the recesses. Output rotor 26 is movable a limited extent axially of the shaft 28. A resilient element 33 (such as a Belleville washer) is disposed against an adaptor 34 and one surface of the output rotor 26 and tends to move the output rotor to dispose the open faces of the recesses 25 and 31 in a closely spaced toroidal chamber forming relation. It will be apparent that rotor 26 is capable of rotation relative to the input rotor section. Such rotary movement of the output rotor may be transmitted to equipment to be driven through a quill shaft 35 having a splined connection with the shaft 28.

The outer housing 10 has a passage 36 formed therein through which hydraulic fluid may be introduced. Passage 36 communicates with one or more passages 37 formed in input rotor section 18 to permit the introduction of fluid under pressure to the interior of the recesses 25 and 31. When rotary motion is transmitted to the input rotor via a shaft 38, the fluid in the toroidal chamber will be centrifuged to the outer portion of the toroidal chamber and will react on the vanes 32 of the output rotor to impart rotary motion thereto, this motion being transmitted from the coupling through the quill shaft 35.

The output rotor 26 has a plurality of bleed holes 40 which permit fluid pressures at opposite sides of the rotor to be initially balanced, thus allowing spring 33 to hold member 26 closely adjacent to section 18. The input rotor 17 has one or more holes 41 in its periphery to permit a limited quantity of fluid to escape during the operation of the coupling. These holes 41 are arranged in a tangential direction which is opposite to the rotational direction. This means will minimize the pumping losses, as opposed to radially placed fluid escape holes. As the speed of rotation of the coupling increases, some slippage will occur between the input rotor section and the output rotor section. The centrifugal force will also increase the pressure of the fluid in the outer portion of the toroidal recesses, tending to move output rotor section 26 in opposition to the force of spring 33. This movement will cause the engagement of clutch surface 42 on rotor 26 with a similar surface 43 provided in section 19. At this time a direct driving engagement will be established between the input and the output rotor sections. No slip between these sections will then take place. The clutch faces 42 and 43 may be suitably finished with friction coatings to resist wear resulting from limited relative movement during the making and breaking of the direct driving engagement.

When it is desired to interrupt the transmission of power from the prime mover to the driven equipment, a suitable valve disposed in advance of the fluid inlet passage 36 will be closed. The hydraulic fluid will be quickly drained from the rotor means and spring 33 will then interrupt the direct driving engagement and input rotor 17 may revolve without transmitting any motion to the output rotor.

The outer housing provides a sump for the hydraulic fluid used in the operation of the coupling. A suitable pump may be provided to transfer such fluid from the sump to the passage 36. In FIG. 1 a pump is indicated at 44, this pump being a drag-type pump connected for operation with the input rotor 17. A feed passage 45 leads from the bottom of the sump to the chamber containing the rotor of the pump 44. A suitable passage (not shown) conducts fluid from the outlet of the pump to a cooler (not shown) from which the fluid will flow to the control valve previously mentioned and thence to the inlet passage 36. It will be obvious that any suitable pump may be employed.

Figure 3:
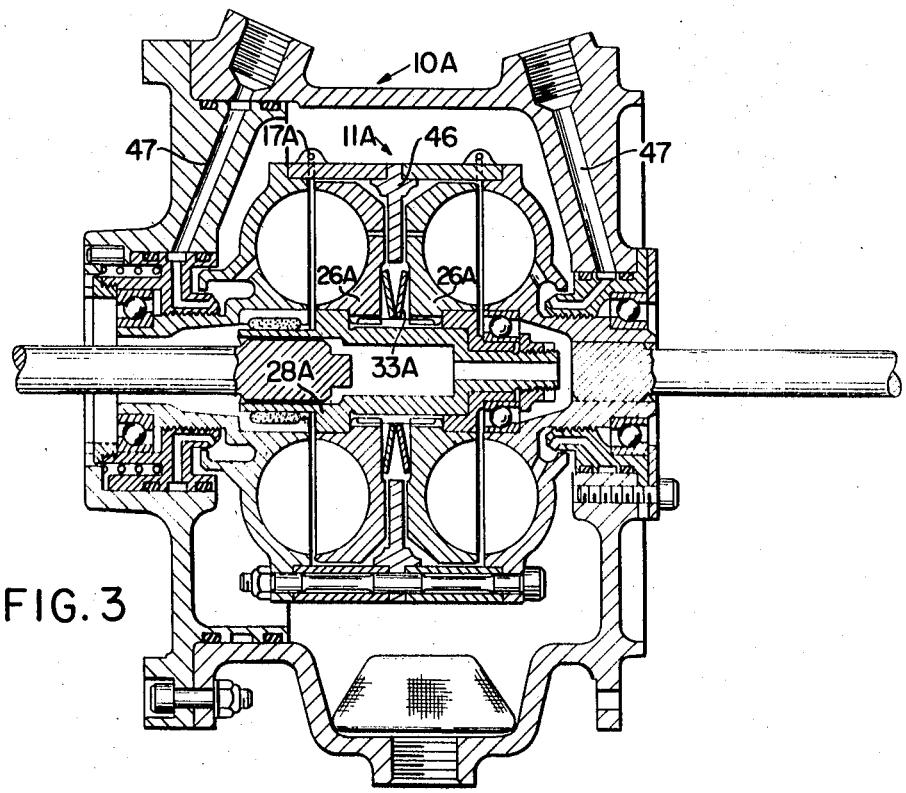
FIG. 3 is a view similar to FIG. 1 taken through a slightly modified form of coupling incorporating the principles of the invention.

FIG. 3 illustrates a modified form of coupling embodying the principles of the present invention. This modified coupling is similar to the one first described, having an outer casing 10A providing an oil sump and chamber to receive complemental input and output rotor means designated generally at 11A. The rotor means includes dual input and output sections 17A and 26A, having semitoroidal recesses at opposite ends of the chamber formed in the input section, these recesses facing in opposite directions. They co-operate with similar recesses formed in dual output sections 26A disposed for limited axial movement on shaft section 28A. Springs 33A (opposed Belleville washers) tend to force the sections 26A in opposite directions to dispose the open faces of the recesses therein into close toroidal chamber forming proximity with the recesses in the input rotor.

As in the first form of the invention, the input and output rotors have vanes extending across the recesses for performing the fluid driving function. The input section is provided with a wall 46 extending between the dual output rotor sections, this wall having clutching faces on opposite sides for direct engagement by clutching faces formed on the output rotor sections. Fluid passages 47 are arranged to direct fluid under pressure into the toroidal recesses during the operation of the fluid coupling, as in the first form of the invention. This coupling functions in the same manner as the coupling first described, rotation of the input section at high speed creating increased fluid pressure, which moves the output sections to establish a direct driving engagement thereof with the input section.

It is again pointed out that during this direct driving engagement no slippage occurs between the input and output rotors. At the time the direct driving engagement is established or interrupted, the rotor sections will be revolving at substantially equal rates and minimum wear on the clutching faces will take place.

We claim:
1. A fluid coupling, comprising:
  (a) means forming an outer housing;
  (b) complemental input and output rotor means supported for independent rotary movement in said outer housing, said rotor means providing a split toroidal fluid receiving chamber with radially extending reaction vanes spaced circumferentially therein effective to transmit rotary movement of said input rotor to said output rotor when said chamber is supplied with fluid under pressure, said output rotor also being supported for limited axial movement relative to said input rotor;
  (c) resilient means tending to move said output rotor axially to dispose the toroidal chamber section therein in close proximity to the similar section in said input rotor;
  (d) clutch faces provided on said input and output rotor means for driving engagement when said output rotor is moved in opposition to said resilient means;
  (e) means in said input rotor means for directing fluid under pressure to the toroidal chamber provided by said input and output rotor means; and
  (f) tangentially extending port means formed in said input rotor means for bleeding a predetermined limited amount of fluid from the chamber therein during operation of the coupling.

2. The fluid coupling of claim 1 in which said output rotor is provided with ports establishing communication between the semitoroidal recess and the chamber in said input rotor means to equalize pressures at opposite sides of said output rotor means.

3. The fluid coupling of claim 2 in which the impeller of a fluid pump is connected for rotation with said input rotor means to supply fluid under pressure to the means for directing fluid to said toroidal chamber.

4. The fluid coupling of claim 3 in which means are provided to conduct fluid from said outer housing to said fluid pump.

5. The fluid coupling of claim 1 in which said rotor means provides a plurality of split toroidal fluid receiving chambers with radially extending, circumferentially spaced reaction vanes.

6. The fluid coupling of claim 5 in which the output rotor means includes a plurality of sections and a plurality of sets of clutch faces are provided on said input and output rotor means.

7. A fluid coupling, comprising:
(a) means forming an outer housing;
(b) complemental input and output rotor means supported for independent rotary movement in said outer housing, said input rotor means forming a chamber with a semitoroidal recess at each end opening to said chamber, the output rotor means being of two sections with semitoroidal recesses adjacent to and facing the recesses in said input rotor means, said rotor means having radially extending vanes spaced circumferentially of each semi-toroidal recess and effective to transmit rotary movement from said input to said output rotors when said chamber is supplied with fluid under pressure, said output rotor sections being supported for limited axial movement relative to said input rotor;
(c) wall means on said input rotor means projecting between the sections of said output rotor means, the adjacent areas of said wall and output rotor means having complemental clutch faces;
(d) resilient means between said output rotor sections tending to separate said complemental clutch faces and position the toroidal recesses in said output rotor sections in close proximity to the similar recesses in said input rotor; and
(e) means for directing fluid under pressure into said chamber.

References Cited

UNITED STATES PATENTS

| | | | |
|---|---|---|---|
| 2,055,300 | 9/1936 | Maurer | 192—3.29 X |
| 2,093,498 | 9/1937 | Walti | 192—3.29 |
| 2,351,483 | 6/1944 | Carnagua | 192—3.3 |
| 2,397,869 | 4/1946 | Kirby | 192—3.29 |
| 2,969,131 | 1/1961 | Black et al. | 192—3.3 X |
| 3,295,646 | 1/1967 | Peterson | 192—89 X |

FOREIGN PATENTS 668,839   7/1929   France.

BENJAMIN W. WYCHE III, Primary Examiner

U.S. Cl. X.R.

60—54; 192—89